Feb. 5, 1929.
J. W. HOOLEY
CONDUIT ELBOW
Filed Sept. 17, 1927
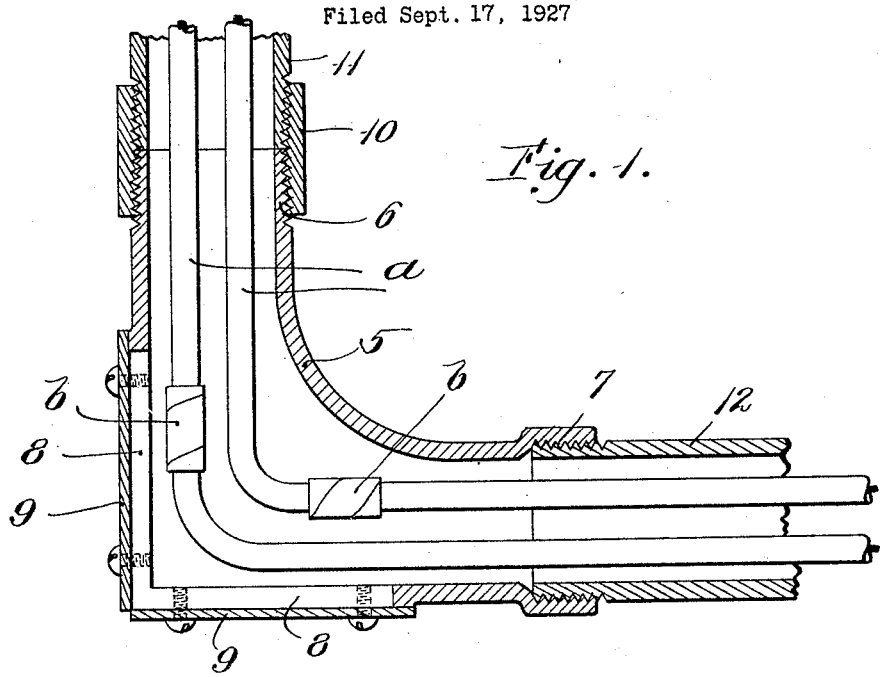
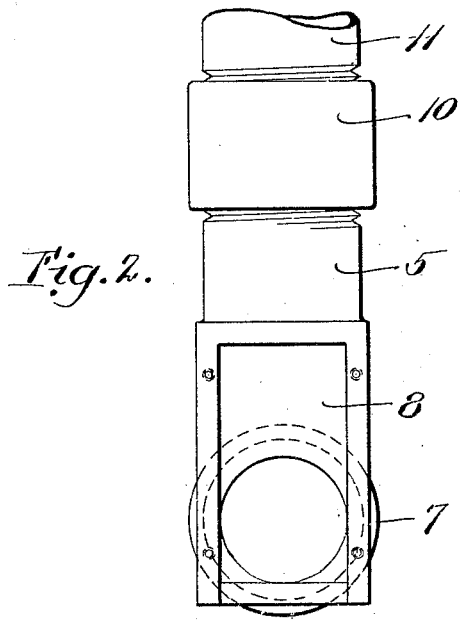
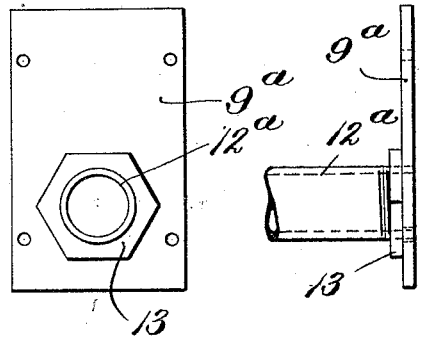
Inventor:
John W. Hooley
by A. W. Harrison
atty.

Patented Feb. 5, 1929.

1,700,983

UNITED STATES PATENT OFFICE.

JOHN W. HOOLEY, OF LARCHMONT, NEW YORK.

CONDUIT ELBOW.

Application filed September 17, 1927. Serial No. 220,132.

This invention relates to conduits especially for containing electric cables or wires, and has particular reference to the structure of the elbows or junction fittings employed when the conduits and their contained cables or wires are to lead in different directions and consequently the conduit system must include angular members.

When the ordinary plain elbows in the form of curved pipes or couplings are employed, the pulling of the cables around the bend is very materially resisted by friction, and such friction is so great that the number of elbows in any run of conduit has to be limited, and even then often requires the use of power devices to pull the cables through. And of course the cables are liable to be damaged by the strain and the pressure against the inner walls or curves of the elbows.

The object of my present invention is to provide elbows or conduit-connecting fittings which will permit wires or cables to be drawn in or through with little or no friction, in either direction, and providing a chamber in which splicing can be readily effected, thereby eliminating specially constructed junction boxes and splicing chambers.

With the above object in view, the invention consists in the elbow or angular junction fitting substantially as hereinafter described and claimed.

Of the accompanying drawings:

Figure 1 represents a longitudinal section through one of my improved elbows, and illustrating cables therein.

Figure 2 is an elevation from the left of Figure 1, the covers being removed.

Figures 3 and 4 are, respectively, an elevation and side view of a special structure of cover which may be employed.

Similar reference characters indicate similar parts or features in all of the views.

Referring first to Figures 1 and 2, the elbow 5 is illustrated as externally threaded at one end 6 and having an internally threaded enlargement or hub 7 at the other end. The outer or salient portion of the elbow is formed with openings 8 at opposite sides of the apex of the angle, which openings may be rectangular as illustrated or otherwise shaped, and which for some purposes may be longer and extend to the threads at the ends of the elbow.

Suitably shaped to cover the two openings 8 are plates 9 which may be secured in place by screws as illustrated.

A coupling 10, engaging the threads 6, is employed for connecting one conduit 11, the other conduit 12 engaging the internally threaded hub 7.

The device as so far described may be used in various ways:—Assuming that the conduit system or run is installed in the required places in a building, with my improved elbows at all necessary angles in the run, the cover plates will be temporarily removed, and cables $a$ can be pulled straight through from either direction and coiled or looped outside an elbow and then pulled into and through the other arm of the elbow and its conduit, all without causing any substantial friction with the interior of an elbow. There need not be much or any looping or coiling outside of the elbow as just described, for the cables can be drawn but a short distance in the first direction and then the slack immediately taken up by pulling in the second direction.

If desired, either or both of the cover plates may have an opening for connection thereto of a conduit, as illustrated by Figures 3 and 4 in which the cover plate $9^a$ is provided with a hole into which an end of a conduit $12^a$ is screwed and held firmly by a lock nut 13. Branch wiring spliced to cables in the elbow can lead through such conduit $12^a$. If desired, one of the two cover plates can be removed while splicing is being effected with wires or cables which are in the conduit $12^a$ of the other cover plate mounted in position.

In Figure 1 cable splicing is illustrated at $b$. It will be readily understood that such splicing at $b$ can be effected while either or both of the cover plates are removed.

I do not limit myself to the particular angular shape of the elbow as illustrated, nor to any particular means for connecting the conduits to its ends. Nor do I limit myself to the specific shape or size of the openings and cover plates. The cover plates may be laterally curved instead of flat and the seats around the openings in the elbow would then be correspondingly curved. And said cover plates may be secured in place by any suitable couplings or clamps or other devices, of a character to enable them to be removed for the purpose of enabling cables or wires to be drawn or pulled as described and enabling splicing to be effected within the elbow.

It is important that the openings 8, which are independent of each other, shall be in line with the tubular portions of the elbow or fitting so that when either or both of the cover plates 9 is or are removed, cables can be pulled straight through in either direction as hereinbefore described. It is also important that the two openings meet or merge at the apex of the outer angle of the fitting so that unobstructed access can be had, when required, to the interior of the fitting. And owing to the fact that the wall of the fitting directly opposite the openings 8, is so formed as to present a smooth curved surface, no injury can be caused to cables which are being manipulated or drawn as hereinbefore described.

Having now described my invention, I claim:

1. A junction fitting for conduits, said fitting having tubular conduit-receiving portions at an angle to each other, and provided with independent openings in line with said tubular portions, and independent means for closing said openings.

2. A junction fitting for conduits, said fitting having tubular conduit-receiving portions at an angle to each other and provided with independent openings in line with said tubular portions, said openings meeting at the apex of said angular portions to provide unobstructed access to the interior of the fitting, and independent means for closing said openings.

3. A junction fitting for conduits, said fitting having tubular conduit-receiving portions at an angle to each other and provided with independent openings in line with said tubular portions, said openings presenting flat marginal bearing surfaces, and cover plates removably secured to said bearing surfaces.

4. A junction fitting for conduits, said fitting having tubular conduit-receiving portions at an angle to each other and provided with independent openings in line with said tubular portions, the wall of the fitting opposite said openings presenting a smooth curved surface, and independent means for closing said openings.

In testimony whereof I have affixed my signature.

JOHN W. HOOLEY.